July 30, 1963 S. BESKOW 3,099,246
TEAT CUP FOR MILKING MACHINES
Filed May 10, 1961
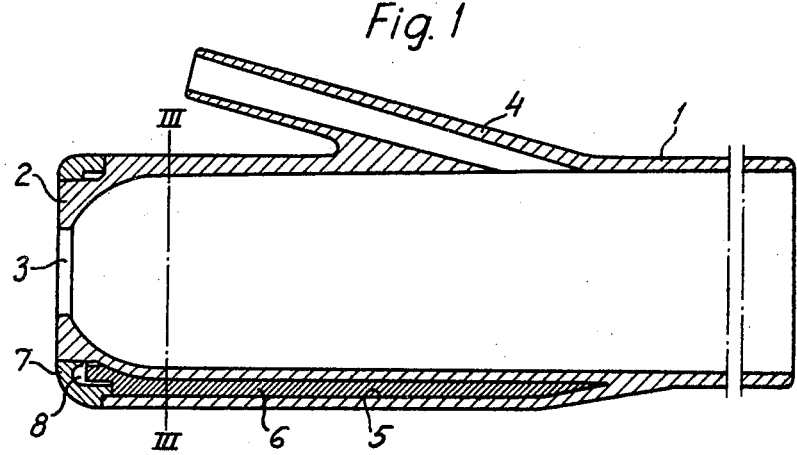
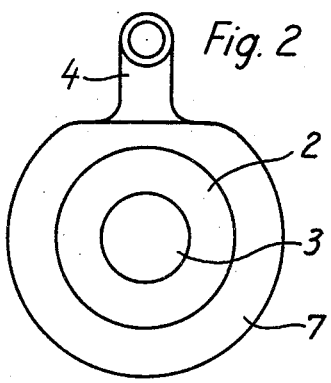 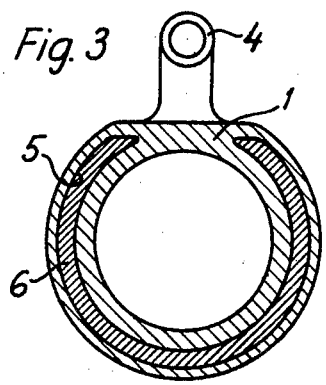
INVENTOR.
Stig Beskow
BY Davis, Hoxie, Faithfull & Hapgood
Attorneys

United States Patent Office 3,099,246
Patented July 30, 1963

3,099,246
TEAT CUP FOR MILKING MACHINES
Stig Beskow, Bromma, Sweden, assignor to Aktiebolaget Separator, Stockholm, Sweden, a corporation of Sweden
Filed May 10, 1961, Ser. No. 109,072
Claims priority, application Sweden May 19, 1960
5 Claims. (Cl. 119—14.49)

This invention relates to a teat cup shell for use in a mechanical milking machine. More particularly, the invention has reference to a teat cup shell which can be varied in weight to provide a more efficient milking operation.

Teat cup shells as made heretofore have varied greatly in weight. The variation in weight of the shell as well as the variation in weight of the milk claw and tubing attached to the shell have produced different total weights for different combinations of apparatus. In a mechanical milking operation, it is of importance that the teat cups including the milk claw and tubing have a weight adapted to each animal, so that during the milking operation, particularly the latter part of it, the teat cup and accessories will exert a positive pull, thereby facilitating the milk flow. In addition, the required pull on the teats during milking varies according to the location of the teats. If the front teats are located at a higher level than the rear teats, they require a different pull. Adjustments to achieve the correct pull have been made primarily by displacing the mechanical milking pail so that the tubes connected to it exert the correct pull.

It has also been found that certain livestock require a certain weight of teat cup and accessories to achieve an efficient milking. The required weight varies according to the different udder configurations. Until now, teat cups and accessories have been made of a certain experimentally determined average weight for all milk claws and for all livestock breeds, because it has been impracticable to vary the weight of the teat cups. This is no longer satisfactory.

The principal object of the present invention is to provide a teat cup shell of variable weight to overcome the above-noted disadvantages.

According to this invention, the teat cup shell is provided with cavity in its wall into which a suitable weight may be fitted. The cavity may be closed by means of a tight sealing cap after the weight has been introduced. The cap and cavity opening may be located at one end of the teat cup shell, since this will facilitate the introduction of the weighted body. The cavity in the wall of the shell preferably extends around the shell or around the major part of the circumference of the shell and also along the major portion of the axial length of the shell, as this enables a more symmetrical distribution of the weight introduced into the shell. This also makes it possible to keep the outer diameter of the shell susbtantially constant along the major part of the shell length and still have a space for the largest possible weight in the cavity, without increasing the outer diameter of the shell.

The invention is described in more detail below, reference being made to the accompanying drawings, in which:

FIG. 1 is a longitudinal sectional view of a teat cup shell embodying a preferred form of the invention;

FIG. 2 is an end view of the teat cup shell shown in FIG. 1; and

FIG. 7 is a sectional view on line III—III of FIG. 1.

In FIG. 1, the teat cup shell as shown comprises a cylindrical tube 1 open at both ends and having a neck 2 forming an opening 3 at one end. A spout or connecting tube 4 on the side of the shell is adapted to be connected to a flexible tube from a pulsator (not shown) in the conventional manner. A cavity 5 in the wall of the teat cup shell is filled with the weighted body 6. The cavity 5 may extend around the entire circumference of the shell or, as illustrated, around only the major portion of the circumference. The cavity 5 may extend any desired distance in the axial direction of the shell but, as shown, extends along the major part of its axial length. A liquid-tight cap 7 closes the cavity opening 8, so that the cavity is maintained in a dry condition.

The opening 8 and the cap 7 are essentially ring-shaped and are located in one end of the teat cup shell, preferably adjacent the neck 2. After the size of the weight has been determined, a body 6 corresponding to that weight is introduced into the cavity and the cap 7 is secured tightly, so that liquid cannot penetrate into the cavity when the teat cup shell is cleaned. The weight 6 can be of lead or any desired metal, since it is enclosed and protected from air or the liquids in contact with the teat cup shell.

I claim:

1. The combination of a teat cup shell comprising a cylinder having a hollow interior and also having a cylindrical wall defining a cavity extending partly around the cylinder axis and separated from said hollow interior of the cylinder, the cavity also extending along a substantial part of the length of the cylinder, a removable closure for said cavity, and a weight disposed in said cavity.

2. The combination defined in claim 1, in which said cavity has an opening at one end of the cylinder, said closure covering said opening.

3. The combination defined in claim 1, in which said cavity extends around the major part of the circumference of the cylinder.

4. The combination defined in claim 1, in which said cavity extends along the major part of the length of the cylinder.

5. The combination defined in claim 1 comprising also a tube communicating with the interior of the cylinder through said cylindrical wall.

References Cited in the file of this patent
UNITED STATES PATENTS

| | | |
|---|---|---|
| 1,417,801 | Cook | May 30, 1922 |
| 2,484,696 | Dinesen | Oct. 11, 1949 |